July 10, 1951     A. C. COUTANT ET AL     2,560,159
FILM MOVEMENT CLAW ARRANGEMENT
Filed July 27, 1948
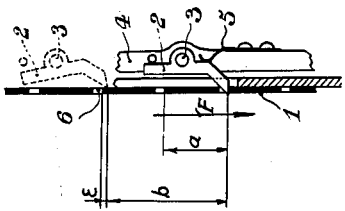
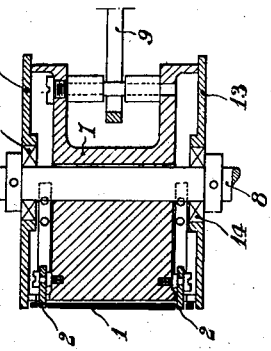
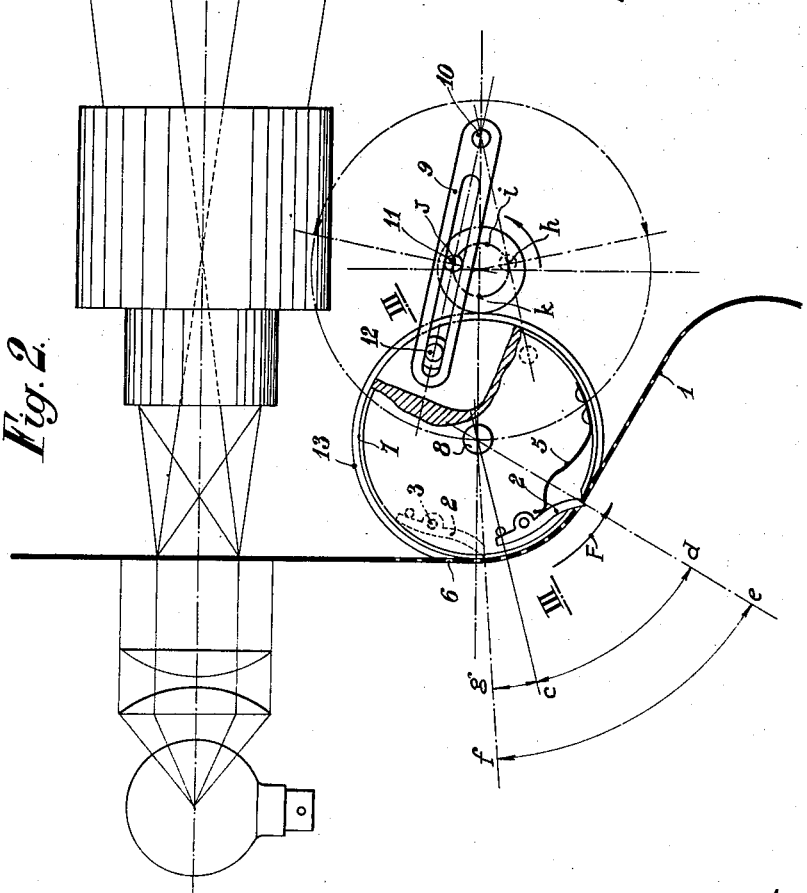
Inventors
Andre Clement Coutant
Jacques Mathot
By Robert E. Burns
Attorney Patented July 10, 1951

2,560,159

UNITED STATES PATENT OFFICE 2,560,159

FILM MOVEMENT CLAW ARRANGEMENT

André Clément Coutant and Jacques Mathot, Paris, France

Application July 27, 1948, Serial No. 40,924
In France April 24, 1947

6 Claims. (Cl. 88—18.4)

The driving of a film by a jerky movement using one or several pawls, singly or in a plurality, is known, whose entering in the holes is caused by the action of a spring weak enough to allow reversing, without turning the film itself owing to the fact that the pawls have a suitable shape allowing their soft sliding on the perforations during the time of exposing the film to the light, whether it concerns the taking of photographs or projection.

These pawls are generally assembled on a frame actuated with a reciprocating rectilinear movement, so that during the period of changing of the film, the pawls drive the image of the film and then rise along the film, then stop at the height of an image for a new change, and so on.

The present invention has for its object to greatly improve the luminous output of a cinematograph apparatus by increasing the time of stopping of the film in the track, which is equivalent to increasing the speed of change of the film. This result is obtained owing to the driving mechanism of the film by pawls about to be described.

The accompanying drawing shows two methods of embodiment of this mechanism.

Fig. 1 is a vertical section showing one of the rows of perforations of a film driven by pawls with rectilinear displacement.

Fig. 2 is a vertical section corresponding, in the case where the displacement of the pawls work according to an arc.

Fig. 3 is a section on III—III of Figure 2.

In the first case, the film 1 is driven periodically in the direction of the arrow F by two pawls 2 each hinged in 3 on a frame 4 actuated with a vertical reciprocating movement of constant amplitude. Each of said pawls is pressed against the film by a spring 5 assembled on said frame so that its point is apt to engage in the perforations 6 of the film. In this example, the film is of the type of reduced size and includes on each side, a single hole for each image.

According to the invention, the vertical course of the frame 4 is defined so as to be almost equal to the double of the spacing of the perforations 6. As a result, if the periods of upstroke and downstroke of the frame are of the same duration, the driving period of the film downwardly may be included between the third and the quarter of the total of these times; in other words, the duration of the change is greatly reduced to the benefit of the duration of the exposition of the images, and a great gain ensured in the use of the light.

This driving device is insensitive to the variations of pitch of the perforations due to the lengthenings or shortenings of the film, the course of the frame 4 being determined taking into account the maximum abridgements so as to avoid the pawls from untimely jumping over an adjacent hole after their upward travel motion.

On Fig. 1, $a$ shows the minimum pitch of the perforations, that is to say, the height of the images, and $b$ is the constant stroke of the pawls; said stroke is equal to $2a - \epsilon$, $\epsilon$ being as reduced a quantity as possible, that is, some tenths of millimeters.

According to the second method of embodiment given by way of example (Figs. 2 and 3), the film passes against a smooth drum 7 fixed on a shaft 8 and actuated with an oscillatory motion of constant amplitude by means of a lever 9 swinging about a fixed axis 10; said lever has a lengthwise groove in which two pins 11 and 12 can slide, the first of which is actuated with a continuous rotary movement and the second is integral with the drum. The driving pawls 2 are hinged on the ends of the drum and each of which are slightly pressed against the film by a spring 5. The film is borne against the smooth surface of the drum by a skid with spring not shown, and which is laterally guided by circular cheeks 13 assembled on ball-bearings 14 so as to turn freely about the shaft 8.

In this example, the film has on each side, four perforations 6 per image, so that if the duration of the downstroke movements of the pawls were equal to that of the upstroke movements, the reduction of the periods of change for the benefit of the periods of exposition could not reach such a high value as in the previous case. The ratio of said duration of change and exposition would be in the ratio of the arcs $$\frac{cd}{efgc}$$

But the method of control of the drum obviates this deficiency because it ensures a large difference between the duration of the to-and-fro motion of the pawls; as a matter of fact, Fig. 2 shows that the durations of downstroke and upstroke are in the same ratio as the arcs $hij$ and $jkh$ described by the pins 11 between the limited positions of the lever 9. It is thus still possible to obtain much greater periods of exposition than the periods of change.

Instead of a single pawl 2, several similar pawls may be assembled on each end of the smooth drum 7 for the purpose of allowing the passing of any film, shortened or lengthened, on all existing apparatus. It should be noted that the device with smooth drum described above has over the known devices of drums with Maltese cross and others, the additional advantage of being much more silent.

Of course, the two methods of embodiment described above are merely given by way of example and the invention includes the use of all other equivalent mechanical means, suitable for carrying to the maximum the ratio between the durations of exposition and the durations of change of the images. In particular the mechanism described for the control of the drum 7 may be used for controlling the frame 4 so as to impart a quicker motion on the downstroke than on the upstroke.

What we claim is:

1. A driving mechanism of a film whose edges are perforated, comprising a smooth drum 7 swinging about a fixed axis 8, two pawls 2 hinged on the sides of said drum, springs 3 fixed to the drum and acting upon the beaks of the pawls so as to make a projection on the periphery of the drum, a pin 12 fixed to the drum and parallel to said drum, a lever 9 swinging about another fixed axis 10 parallel to the drum, a pin 11 turning at constant speed about a fixed axis situated between the axis 8 of the drum and the swinging axis 10 of the lever, the two above mentioned pins being assembled slidingly along said lever.

2. A driving mechanism according to claim 1, comprising two discs 13 pivoting freely about the axis 8 of the drum, near the sides of said drum, their diameter being a little larger than that of said drum.

3. A mechanism for stepwise feeding a perforated film comprising a smooth rocking drum oscillatable on a fixed axis, means for guiding the film against the curved surface of said drum, at least one pawl pivoted on said drum, at least one spring in said drum urging said pawl to project radially to the outside of the drum, a lever mounted for swinging motion about a fixed pivot, a slot in said lever, a wrist projecting sidewise from the drum guided in said slot and means to swing said lever and consequently to rock said drum decidedly quicker in the one direction than in the other, said means to swing said lever including a pin adapted to turn about a fixed axis at a constant speed and engaged in said slot in said lever whereby said pin slides freely along said lever while forcing said lever to pivot about its fixed pivot.

4. A driving mechanism for film having a row of perforations for moving the film intermittently along a predetermined path, comprising an oscillatable member disposed adjacent the path of said film, a pawl hingedly mounted on said oscillatable member and carried back and forth by the movement of said member, a spring pressing the pawl into engagement with the perforated portion of the film, a lever for oscillating said oscillatable member, said lever being swingable about a fixed pivot spaced from the oscillatable member in a direction approximately perpendicular to the direction of movement of the film, and a crank pin rotatable at a constant speed in a circle about a fixed axis parallel to the axis of said fixed pivot and pivotally engaging the lever to swing it in an arc about said fixed pivot, and thereby impart oscillatory movement to said oscillatable member, sliding connections being provided to permit relative movement of the lever, the fixed pivot and the crank pin, whereby the effective lever arm between the fixed pivot and the point of engagement of the crank pin with the lever is greater when the crank pin is on the far side of its orbit from said fixed pivot than when the crank pin is on the near side of its orbit, the angular speed of the lever varying inversely with the length of said lever arm.

5. A mechanism for intermittently feeding a perforated film having one set of perforations per picture, comprising a pawl adapted to be engaged in a perforation of the film, pawl driving means for imparting a reciprocating movement to said pawl whereby alternately to move said pawl in a film driving stroke and in a return non-driving stroke, and resilient means for pressing said pawl against the film, said pawl driving means being arranged to disengage the pawl from the leading edge of a film perforation at one end of the film driving stroke and to move it longitudinally of the film in the return non-driving stroke a distance only slightly less than twice the distance between two successive perforations.

6. A mechanism for intermittently feeding a perforated film through a cinematograph machine, comprising a pawl adapted to be engaged in a perforation of the film, pawl driving means for imparting a reciprocating movement to said pawl whereby alternately to move said pawl in a film driving stroke and in a return non-driving stroke, and resilient means for pressing said pawl against the film, said pawl driving means being arranged to disengage the pawl from the leading edge of a film perforation at one end of the film driving stroke and to move it longitudinally of the film in the return non-driving stroke beyond the trailing edge of the next perforation which will be engaged by the pawl upon a subsequent film driving stroke at least a major portion of the distance between said next perforation and the next perforation in the film, the said distance being such that upon the subsequent film driving stroke the pawl will travel at least about one-third of its stroke before reaching the said next perforation to engage therein to drive the film.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 1,796,432 | Barlatier | Mar. 17, 1931 |
| 2,167,713 | Githens et al. | Aug. 1, 1939 |
| 2,168,043 | O'Grady | Aug. 1, 1939 |
| 2,178,243 | Sachtleben | Oct. 31, 1939 |
| 2,260,530 | Ludwig | Oct. 28, 1941 |

FOREIGN PATENTS

| Number | Country | Date |
|---|---|---|
| 521,086 | Germany | Mar. 18, 1931 |